United States Patent
Faidutti et al.

[15] 3,671,535
[45] June 20, 1972

[54] 4-IMINO-OXAZOLIDIN-2-ONES AND PROCESS OF PREPARATION

[72] Inventors: Michel Faidutti, Saint-Auban; Jacques Boileau, Paris; Jean-Paul Konrat, Sorgues; Rene Billaz, Le Bouchet, all of France

[73] Assignee: Etat Francais, represente par le Ministre des Armees, Delegation Ministerielle pour l'Arement (Direction Des Poudres), Paris, France

[22] Filed: March 7, 1968

[21] Appl. No.: 711,384

Related U.S. Application Data

[63] Continuation-in-part of Ser. No. 349,943, March 6, 1964, abandoned.

[52] U.S. Cl. ..........................260/307 C, 71/88, 260/307 B, 260/347.3, 260/464, 260/465 D, 260/465.4, 260/514 R, 260/521 R, 260/535 R, 260/557 R, 260/558 R, 260/561 B, 260/562 R
[51] Int. Cl. .......................................................C07d 85/28
[58] Field of Search................................................260/307.3

[56] References Cited

OTHER PUBLICATIONS

Davies et al., J. Chem. Soc., 1950, pp. 30– 34.

*Primary Examiner*—Alex Mazel
*Assistant Examiner*—R. J. Gallagher
*Attorney*—Bacon & Thomas

[57] ABSTRACT

The present invention relates to 4-imino-oxazolidin-2-ones corresponding to the following formula:

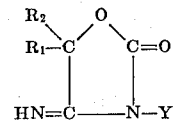

wherein Y represents an alkyl of from one to 18 carbon atoms such as methyl, ethyl, isopropyl, hexyl, octadecyl; cycloalkyl such as cyclohexyl; an aralkyl such as benzyl; an aryl such as phenyl and naphthyl; a substituted aryl such as tolyl, o-, m- and p-chloro-phenyl, methoxy phenyl, nitrophenyl; heterocyclic group such as furyl; and wherein $R_1$ and $R_2$ each represent hydrogen; a straight or branched unsubstituted alkyl of from one to eight carbon atoms such as methyl, propyl, isopropyl, butyl, tert-butyl and heptyl; aryl such as phenyl; heterocyclic group such as furyl derivatives

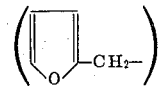

or $R_1$ and $R_2$ may represent the necessary groups which when joined form a ring with the carbon atom of the main oxazolidin-2-one ring such as a cyclohexane ring. The invention is also directed to various methods for preparing the subject compounds which have been found to possess valuable plant growth regulating properties.

14 Claims, 1 Drawing Figure

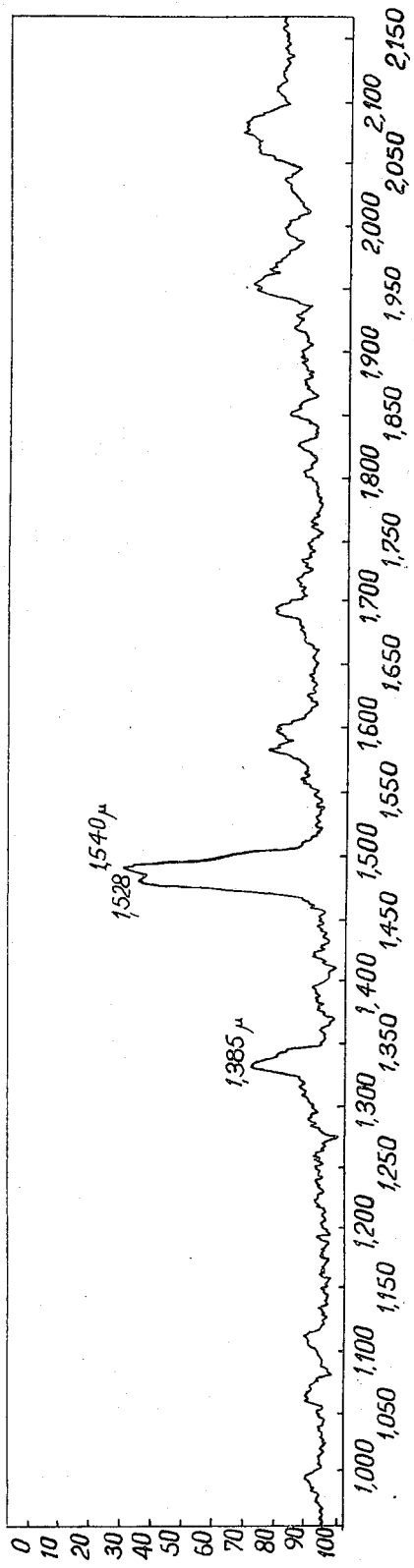

4-IMINO-OXAZOLIDIN-2-ONES AND PROCESS OF PREPARATION

This application is a continuation-in-part application of application, Ser. No. 349,943 filed on Mar. 6, 1964 (now abandoned).

BACKGROUND AND GENERAL DESCRIPTION OF THE INVENTION

The compounds of the invention as described in the foregoing "Abstract" although isomers of urethane-nitriles of the formula

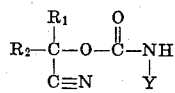

exhibit during infra-red studies a band at $1,540\mu$ which corresponds to the imino group, $=NH$. This band is not apparent when the nitriles are subjected to the same type studies.

The accompanying drawing illustrates the graph of a spectrum of a particular compound of the invention, in which Y is a phenyl radical, $R_1$ is a hydrogen atom and $R_2$ is a methyl radical. It will be noted that this spectrum shows a characteristic band for $1528\mu$ attributable to the

group.

The compounds of the present invention have been subjected to various methods of identification in order to determine their exact chemical nature. As examples of the methods employed may be mentioned:

1. Bromination of a chloroform solution (in the cold) of compounds of the invention. According to the method a single bromine atom was fixed to the molecule, which corresponds to the formation of an N-bromo-imine. The compounds of the invention were found to have a marked basic character and to behave essentially as the mono-imines of oxazolidine-diones.

2. By the formation of addition salts with acids which addition salts are also included in the present invention. Hydrochloric acid, for example, reacts in the gaseous state with an organic solution and, in aqueous solution in the cold, with an aqueous suspension of a compound of the invention. A hydrochloride of the imine derivative is thus obtained, which is only slightly soluble in water. In water the hydrochloride has the tendency to hydrolize into the oxazolidine-2,4-dione.

3. The basic character of the imine derivatives of the present invention allows them to be estimated by potentiometry in a non-aqueous medium, for example, while they are mixed with a urethane-nitrile used for their preparation or obtained along with them.

4. Another characteristic of the imine compounds of the invention is that acid hydrolysis of the compounds gave in very good yields the corresponding oxazolidine-2,4-diones.

5. By basic hydrolysis on the other hand, the imine derivatives of the invention gave, also in good yield, the amide-alcohols or alpha-hydroxy amides corresponding to the following formula:

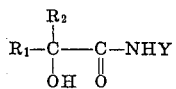

These amide-alcohols are also known products of degradation of oxazolidine-2,4-diones.

6. Nitrogen content determinations revealed that for a given compound, namely 3-phenyl-5,5-dimethyl-4-imino-oxazolidin-2-one, the nitrogen content was found to be 13.68%. For the formula given above, the theoretical nitrogen content is 13.72%.

The compounds of the invention are particularly useful as plant growth regulants, pharmaceutical products and/or as intermediates in the manufacture of oxazolidine-2,4-diones or the hydroxy-amides.

The present invention also has as one of its aspects a process for the preparation of the compounds of the invention. The process generally comprises the isomerization of a urethane-nitrile of the formula:

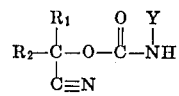

wherein the substituents $R_1$, $R_2$ and Y have the same meaning as given previously for the compounds of the invention, under the influence of a weakly alkaline catalyst. The transformation of the urethane-nitrile into the imine derivative occurs in a quantitative manner without any variation in weight, which establishes that the urethane produces an isomer or a polymer. This is a supplementary proof of the structure of the compounds of the invention.

Oxazolidine-2,4-diones of the formula:

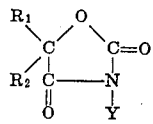

are already known and it is also known that these compounds can be prepared by the reaction of an amine of the formula $YNH_2$ (or its derivatives such as the isocyanates, YNCO) with a derivative of an alpha-hydroxy acid corresponding to the following formula:

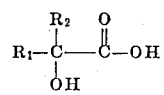

In this method of preparation, it is known to use an ester or an amide having a carboxyl group or an ester such as a carbonate or a chloroformate having an alcohol group.

One of the methods reacts hydrocyanic acid with an aldehyde or ketone of the formula $R_1COR_2$. The hydroxy-nitrile which is formed is then converted into the hydroxy-acid of the above formula or into an ester thereof by hydrolysis or alcoholysis. This compound is then reacted with an isocyanate, YNCO, which produces a urethane ester which is then cyclized to the oxazolidine-2,4-dione.

It has been found that it is possible to modify the order of these reactions, that is, to prepare urethane-nitriles of the formula:

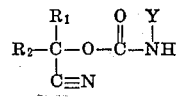

by the reaction of cyanhydrins (hydroxy-nitriles such as those mentioned above) of the formula:

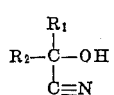

with isocyanates, YNCO, in order to cause hydrolysis or alcoholysis and cyclization into the oxazolidine-diones.

However, applicants have observed that under the conditions mentioned these urethane-nitriles convert into heterocyclic compounds which, as shown above, are 4-imino-oxazolidin-2-ones which are substituted at the ring nitrogen.

The urethane-nitriles and their isomeric compounds, the correspondingly substituted 4-imino-oxazolidin-2-ones, have different infrared spectra. The urethane-nitriles have a single band characteristic of the C = O group at about 1,730 – 1,750 cm$^{-1}$, while the imine derivatives have two bands, one at 1,680 cm$^{-1}$ and the other at 1,780 cm$^{-1}$.

In accordance with the process of the present invention, two different procedures can be followed:

According to the first embodiment, the urethane-nitrile is dissolved in a solvent; an alkaline catalyst is added and, after any filtration required to eliminate the catalyst, the solvent is eliminated. This method can be carried out at ordinary temperature or with heating. Once having obtained the compound, it can be purified by recrystallization.

According to the second embodiment, it is sufficient simply to heat the urethane-nitrile without a solvent to a temperature below 160° C. in the presence of a weakly alkaline catalyst.

The reaction can take place either without a solvent or in the presence of a neutral or basic solvent. The solvents preferably can be a saturated or aromatic hydrocarbon, a chlorinated hydrocarbon, an ester or an ether, a ketone, an alcohol or an amine or an amide. The solvent may be a mixture of the aforementioned solvents and may even contain water.

As suitable alkaline catalysts for the process of the invention can be used, in particular, the hydroxides of the alkali metals or alkaline earth metals, salts of weak acids and strong bases, alcoholates of the alkali metals or alkaline earth metals, primary, secondary or tertiary amines or quaternary ammonium hydroxides.

According to a third embodiment, isomerization of the urethane-nitriles is carried out in the presence of an alkaline ion exchange resin.

As regards the various factors which effect the course of the reaction, the influence of temperature has been studied and it was found that the reaction is more rapid when the reaction medium is warmed or heated than it is when the reaction is permitted to take place in the cold.

The influence of the nature of the alkaline catalyst used has also been studied and it has been observed that the velocity of the reaction is greater as the catalyst is more basic. However, it has also been observed that it is preferable not to use very strong basic catalysts, since this avoids subsequent reactions by decomposition of the imine derivatives.

In the following table, there are set forth the results obtained in the transformation of the urethane-nitrile in which Y is the para-chloro-phenyl radical, $R_1$ is a hydrogen atom and $R_2$ is the ethyl radical.

Chloroform was used as solvent and the concentration by weight of the urethane-nitrile was 1.5%.

The reaction took place at ordinary temperature and the analyses were carried out by infrared spectrophotometry.

In the table, the concentration of the catalyst by weight with respect to the solvent is given and there is also recorded the time in minutes necessary to obtain 10%, 50% and 90% conversion into the imine derivative.

TABLE 1

| Catalyst | Amount, percent | Time in minutes to obtain percentage conversion | | |
|---|---|---|---|---|
| | | 10% | 50% | 90% |
| CH$_3$ON$_a$ | 0.10 | | | 1 |
| CH$_3$ON$_a$ | 0.05 | | | 1 |
| CH$_3$ON$_a$ | 0.006 | | | 1 |
| NaOH, solid powder | | | | 1 |
| Triethylenediamine | 0.1 | | 45 | 60 |
| Do | 0.05 | 30 | 100 | |
| Triethylamine | 0.1 | 15 | 100 | |
| Do | 0.05 | 30 | 150 | 265 |
| Di-n-butylamine | 0.1 | 90 | 600 | |
| Pyridine | 0.1 | 600 | 2,500 | 7,000 |
| n-Butylamine | 0.1 | 1,200 | 3,000 | |
| Dimethylaniline | 0.1 | 10,000 | | |
| Iron acetylacetonate | 0.1 | (¹) | (¹) | (¹) |
| Dibutyl tin dilaurate | 0.1 | (¹) | (¹) | (¹) |
| No catalyst | | (¹) | (¹) | (¹) |

¹ No formation of imine derivative after 10,000 mins..—7 days.

From the foregoing data it was thus observed that there is specificity for certain catalysts. Without a catalyst and in the absence of alkaline traces and also in the presence of acid, the urethane-nitriles did not transform into the imine derivatives. Moreover, the use as catalysts of compounds containing metals, such as iron acetylacetonate or dibutyl tin dilaurate, which are known catalysts for the formation of urethanes from alcohols and isocyanates, did not cause formation of the imine compounds.

Therefore, if in the preparation of the urethane-nitriles a not too strongly alkaline catalyst is used, there is obtained to a greater or lesser extent the imine derivatives according to the invention.

The present invention also concerns processes for the preparation of the 4-imino-oxazolindin-2-ones where the urethane-nitrile is prepared in situ from an isocyanate and cyanhydrin under alkaline conditions, in such a manner that the urethane-nitrile isomerizes at least partially into the 4-imino-oxazolidin-2-one. However, this process which can appear advantageous because it eliminates preparation of an intermediate, namely the urethane-nitrile, has a certain number of disadvantages. When isocyanates are used which react with compounds having mobile hydrogen atoms, the solvents which can be used are less numerous and it is necessary to exclude water, alcohols and amines. Also the range of alkaline catalysts which can be used has to be restricted and consists essentially of the tertiary amines, such as triethylamine and triethylenediamine.

As the reaction of isocyanates with alcohols is exothermic, it is necessary to cool the reaction medium in order to avoid the formation of by-products, due to the influence of the heat, which would render the subsequent purification of the imine compounds more difficult.

It is also preferable to avoid too high concentrations of catalyst and too high temperatures in order to limit or even prevent decomposition of the hydroxy-nitriles or cyanhydrins into hydrocyanic acid on the one hand and the aldehyde or ketone on the other.

In the last-mentioned process for preparation of the imine derivatives, good yields are obtained and the order in which the various reactants are mixed is not important. However, addition of the catalyst to a mixture of cyanhydrin and isocyanate often causes considerable evolution of heat which is more difficult to deal with than if the isocyanate is poured into the cyanhydrin or vice versa, with the catalyst preferably being mixed with one of the two reactants.

Examples of 4-imino-oxazolidin-2-ones according to the invention are given below by way of illustration. Their characteristics are also described, as well as those of the corresponding urethane-nitriles.

The table below includes, for the different substituents, the melting points of the urethane-nitrile and the imino oxazolidinone.

Certain imine derivatives crystallize with difficulty and slowly. When they have been obtained in the form of vitreous products, this characteristic is indicated in Table 2 by the reference v.p. Their structure has been verified by infrared spectrophotometry.

TABLE 2

| Compound number | Y | R₁ | R₂ | Melting points, °C. Urethane-nitrile | Melting points, °C. Imino oxazolidinone |
|---|---|---|---|---|---|
| 1 | C₆H₅ | H | H | 75-76 | 84-86 |
| 2 | m-ClC₆H₄ | H | H | | 94-95 |
| 3 | p-ClC₆H₄ | H | H | 100-101 | 134-136 |
| 4 | C₆H₅ | H | CH₃ | 77-78 | v.p. |
| 5 | m-ClC₆H₄ | H | CH₃ | 60-61 | v.p. |
| 6 | p-ClC₆H₄ | H | CH₃ | 105-106 | solid |
| 7 | C₆H₅ | H | C₂H₅ | 63-64 | v.p. |
| 8 | m-ClC₆H₄ | H | C₂H₅ | 60-61 | v.p. |
| 9 | p-ClC₆H₄ | H | C₂H₅ | 98 | 74-75 |
| 10 | C₆H₅ | H | i-C₃H₇ | 87 | 55-56 |
| 11 | m-ClC₆H₄ | H | i-C₃H₇ | 80 | |
| 12 | p-ClC₆H₄ | H | i-C₃H₇ | 82-83 | 84-85 |
| 13 | C₆H₅ | H | n-C₃H₇ | 64-65 | 64-65 |
| 14 | m-ClC₆H₄ | H | n-C₃H₇ | 84-85 | v.p. |
| 15 | p-ClC₆y₄ | H | n-C₃H₇ | 66-67 | 50-51 |
| 16 | C₆H₅ | CH₃ | CH₃ | 139-140 | 94-95 |
| 17 | m-ClC₆H₄ | CH₃ | CH₃ | 70-71 | 109-111 |
| 18 | p-ClC₆H₄ | CH₃ | CH₃ | 120 | 111-112 |
| 19 | n-C₄H₉ | CH₃ | CH₃ | (¹) | (¹) |
| 20 | α-naphthyl | CH₃ | CH₃ | 138-139 | 159-161 |
| 21 | p-CH₃OC₆H₄— | CH₃ | CH₃ | 100 | 130 |
| 22 | C₆H₅CH₂ | CH₃ | CH₃ | 80 | 103 |
| 23 | o-ClC₆H₄ | H | C₂H₅ | 61 | |
| 24 | o-ClC₆H₄ | H | CH₃ | 93-94 | |
| 25 | o-ClC₆H₄ | CH₃ | CH₃ | 72-73 | 135-136 |
| 26 | o-ClC₆H₄ | H | i-C₃H₇ | 50-51 | |
| 27 | o-ClC₆H₄ | H | n-C₃H₇ | (¹) | |
| 28 | CH₃ | CH₃ | CH₃ | 80 | 78 |
| 29 | C₂H₅ | CH₃ | CH₃ | 95.5 | 83.5 |
| 30 | CH(CH₃)CH₃ | CH₃ | CH₃ | 91 | 140 |
| 31 | (CH₂)₁₇CH₃ | CH₃ | CH₃ | 75 | 59 |
| 32 | C₆H₁₁(cyclohexyl) | CH₃ | CH₃ | 94 | 161 |
| 33 | C₆H₄-CH₃ | CH₃ | CH₃ | 84 | 70 |
| 34 | p-ClC₆H₄ | H | C(CH₃)₃ | 104 | 126 |
| 35 | p-ClC₆H₄ | H | C₆H₅ | 133 | 92-93 |
| 36 | p-ClC₆H₄ | | CH₂-CH₂-CH₂-CH₂-CH₂ (Forms cyclohexane ring) | 150 | 175 |
| 37 | p-ClC₆H₄ | H | furyl-CH₂ | 97 | 97 |
| 38 | C₆H₅ | CH₃ | C₆H₅ | 115 | (²) |
| 39 | m-O₂NC₆H₄— | CH₃ | CH₃ | 121 | 128 |
| 40 | furyl-CH₂ | CH₃ | CH₃ | 52 | (²) |
| 41 | p-ClC₆H₄ | n-C₇H₁₅ | H | | 55 |
| 42 | C₂H₅ | n-C₇H₁₅ | H | (¹) | (¹) |

¹ Liquid.
² Liquid characterized by its spectrum.

SPECIFIC EXAMPLES

Various examples of the preparation and the characterization of compounds of the invention are given below for illustration purposes only and are not to be construed as limiting on the invention as a whole.

EXAMPLE 1

PREPARATION OF A URETHANE-NITRILE 24 g. of phenylisocyanate and 17 g. of acetone-cyanhydrin in 100 cc. of methylene chloride were introduced into a 250 cc. flask provided with a reflux condenser. Several drops of dibutyl tin dilaurate were added. The contents were slightly cooled at the start to moderate the boiling caused by the heat of reaction. The contents were then maintained at the boiling point under reflux for 2 hours. Several drops of glacial acetic acid were added and the solvent was evaporated in vacuo. The product obtained was recrystallized from a mixture of ether and petroleum ether. 37 g. of the urethane-nitrile were obtained; melting point 139°-141°C.

PREPARATION OF AN IMINO-OXAZOLIDINONE 200 cc. of a solvent and 0.4 cc. of triethylamine with 10 g. of the foregoing urethane were added to a 500 cc. flask, the contents of the flask were taken to 40°C. for 2 hours (or to boiling under reflux in the case of a solvent which boils below 40°C.) and then the solvent was evaporated in vacuo. The quality of the product obtained was controlled by infrared spectrophotometry.

The following table gives the results obtained with various solvents:

TABLE 3

| Solvent used | Wt. of product obtained (g). | Melting point of product obtained °C |
| --- | --- | --- |
| Methylene chloride | 9.2 | 90–91 |
| Diethyl ether | 10 | 92–93 |
| Anhydrous acetone | 10 | 90–92 |
| Ethyl acetate | 10 | 92–93 |
| Benzene | 10 | 92–93 |
| Cyclohexane | 10 (mixture of imine derivative and urethane) | — |
| Anhydrous methanol | 10 | 88–89 |
| Acetone + 10% water | 10 | 92–93 |

All the products so obtained are composed of the substantially pure imine derivative with the exception of that obtained from cyclohexane where the transformation is only partial because of the low solubility of the urethane in cyclohexane.

EXAMPLE 2

PREPARATION OF AN IMINO-OXAZOLIDINONE BY MEANS OF AN ION EXCHANGE RESIN 200 cc. of methylene chloride and 5 g. of the basic resin called "Amberlite IR 45" were added, with 10 grams of the urethane prepared according to Example 1 to a 500 cc. beaker. The contents of the beaker were agitated at ordinary temperature. After 4 hours the reaction mixture was filtered. The imine derivative was obtained in substantially pure form.

EXAMPLE 3

PREPARATION OF AN IMINO-OXAZOLIDINONE BY MEANS OF A CATALYST INSOLUBLE IN THE REACTION MEDIUM 10 g. of the urethane prepared according to Example 1 were introduced into a 500 cc. beaker and then 200 cc. of methylene chloride and 1 g. of $K_2CO_3$ were added. Agitation was carried out at room temperature for 1 hour. The beaker contents were filtered and the solvent evaporated. 9.8 g. of the imine derivative in substantially pure form was obtained (melting point 92°–93° C.).

EXAMPLE 4

BROMINATION OF AN IMINO-OXAZOLIDINONE

By the addition of bromine to a chloroform solution of 3-phenyl-5,5-dimethyl-4-imino-oxazolidin-2-one, a light yellow precipitate was obtained which was filtered off. Yield: 85%. The product obtained is insoluble in the usual organic solvents. Melting point: 259°–262° C. It contains a single atom of bromine per molecule (bromine content found: 30.9%; bromine content calculated for the monobromo derivative: 28.3%).

EXAMPLE 5

ALKALINE OR NEUTRAL HYDROLYSIS OF AN IMINO-OXAZOLIDINONE

Two 2 g. samples of 3-p-chlorophenyl-5-methyl-4-imino-oxazolidin-2-one in suspension in 50 cc. of water were boiled as such in one case for 1 hour and in the second case for half an hour with the addition of 5 cc. of 10% caustic soda. In both instances and on cooling the anilide $ClC_6H_4NHCO\cdot CHOHCH_3$ was obtained. Melting point: 100° – 102° C.

EXAMPLE 6

PREPARATION OF AN IMINO-OXAZOLIDINONE HYDROCHLORIDE

Dry hydrogen chloride was bubbled into a toluene solution of 3-phenyl-5,5-dimethyl-4-imino-oxazolidin-2-one. The corresponding hydrochloride precipitated. Melting point: 215° – 220° C.

EXAMPLE 7

ACID HYDROLYSIS OF AN IMINO-OXAZOLIDINONE 20 g. of 3-p-chlorophenyl-5-ethyl-4-imino-oxazolidin-2-one were dissolved in 200 cc. of toluene, 20 cc. of concentrated aqueous hydrochloric acid were added and the mixture was heated for 3 hours under reflux. The aqueous layer was decanted and the organic layer filtered. When the solvents were evaporated, the product which remained was 3-p-chlorophenyl-5-ethyl-oxazolidin-2,4-dione. Melting point: 92° C. (Yield 90–95%). After recrystallization from methanol, the product melted at 95° C.

When sulphuric acid is used, the same oxazolidine-dione is obtained, but the dione is somewhat less pure. The reaction takes place in methanol as the solvent in lieu of toluene and gives lower yields.

EXAMPLE 8

PREPARATION OF AN IMINO-OXAZOLIDINONE FROM A URETHANE-NITRILE WITHOUT SOLVENT 20 g. of the phenyl-urethane of butyraldehydecyanhydrin were heated to fusion at 65° C. and then a drop of triethylamine was added and the mixture cooled. The mixture which crystallizes then became viscous and then assumed the appearance of an oil and after several days it crystallized again. 3-phenyl-5-propyl-4-imino-oxazolidin-2-one was thus obtained quantitatively. The transformation is more rapid if the reaction medium is maintained in the oven.

EXAMPLE 9

DIRECT PREPARATION OF AN IMINO-OXAZOLIDINONE 12 g. of phenylisocyanate and 6 g. of formaldehyde cyanhydrin, $HOCH_2CN$, were dissolved in 100 g. of anhydrous ethyl ether in a flask provided with a reflux condenser. The contents were cooled to 0° C. and then 0.5 cc. of triethylamine were added. The reaction was immediate and very energetic. The ether boiled rapidly and it was difficult not to lose part of it. After 30 minutes, and after the addition of several seed crystals, if necessary, the imine derivative crystallized. Melting point: 84°–86° C.; Yield: 80%.

EXAMPLE 10

PREPARATION OF THE OXAZOLIDINEDIONE BY PASSAGE THROUGH THE NON-ISOLATED OXAZOLIDINONE 153.5 g. of p-chlorophenylisocyanate and 2 cc. of triethylamine were introduced into 1.5 liters of chlorobenzene. 90 g. of propionaldehyde cyanhydrin was added dropwise while the temperature was maintained at 0° C. When the addition was completed, the mixture was heated for two hours at 80° C. Up to 70% yield of a solution of the imine derivative was obtained in chlorobenzene (determination by infrared). This solution was treated with 300 cc. of concentrated aqueous hydrochloric acid at the boiling point for 3 hours. After decantation and washing with water, some of the solvent which entrained the traces of water was distilled off. The mixture was then filtered while hot and the remaining solvent evaporated. 3-p-chlorophenyl-5-ethyl-oxazolidine-2,4-dione was obtained in a yield of 65% after recrystallization from methanol.

EXAMPLE 11

PREPARATION OF AN OXAZOLIDINEDIONE BY PASSAGE THROUGH THE IMINO-OXAZOLIDINONE HYDROCHLORIDE 31 g. of p-chlorophenylisocyanate and 1 cc. of triethylamine were introduced into 200 cc. of toluene. 18 g. of propionaldehyde cyanhydrin was added dropwise while the temperature was maintained at 15° C. The mixture was then heated for half an hour under reflux. After the medium was cooled, dry hydrogenchloride was bubbled into the reaction medium. A large amount of white precipitate was obtained which was filtered off and washed with dry toluene. Yield: 70%. The hydrochloride was treated for 10 minutes with boiling water and gave quantitatively 3-p-chlorophenyl-5-ethyl-oxazolidine-2,4-dione. Melting point after recrystallization: 94° C.

The compounds of the invention have been tested and have been found in all cases to possess vegetable growth regulation properties. The compounds possess action thresholds substantially comparable to those of numerous substances which are presently being used as herbicides, such as isopropyl-phenyl carbamate, amino-triazole and substituted benzoic acids. In addition the invention compounds have a low remanence of the order of one to a few weeks (under normal conditions in summer with a temperate climate) and have a selectivity which is, of course, peculiar to them.

Under the above described conditions, the compounds can very advantageously be employed alone or in admixture in total (industrial) and selective (agricultural) herbicides.

The compounds of the invention can be made into compositions such as millable powders which are obtained by simply grinding the compound with a carrier or by dissolving them in a volatile solvent in the presence of the carrier. The solvent is then eliminated by evaporation to yield the desired form. These compositions can also be prepared in emulsion form by dissolving the compound in a solvent of low or zero polarity and then dispersing in water, preferably by means of a dispersing agent.

In the preparation of the second type of composition, polar solvents such as alcohol and acetone are not suitable. In addition, solvents of an accentuated basic character, such as triethanolamine, are also not suitable, because of the possible decomposition of the compounds of the invention in such a solvent.

Emulsified solutions can be obtained containing 20 to 50% of the active material in the mother solution constituted by solvents such as benzene, xylene, toluene, white spirit, cyclohexanone and methyl ethyl-ketone. A small proportion of polar solvents in the mother solution, preferably less than 5%, can favor solubilization. Dimethyl formamide or dimethyl sulphoxide advantageously can be employed.

The plant growth regulating properties of the compounds of the invention with a certain number of plants cultivated in rows and in pots, under controlled conditions and temperature, sunlight and mineral supply are illustrated by the following:

The compounds were scattered in the form of a finely-pulverized emulsion on the leaves and on the soil in proximity to the plant, when the plants were aged up to about 3 weeks. The plants were gathered 15 days after the treatment and the dry weight of the plants so gathered was then determined.

The percentage by weight of plants treated and then recovered with respect to the dry weight of control plants was thus determined, in order to calculate the inhibition of growth.

In these tests, a formulation was used based on "Tween" (fatty alcohol derivative) which, as is known, has low phytotoxicity. The following table sets forth the results obtained with a certain specific compounds of the invention which are listed in the table by the nature of the Y, $R_1$ and $R_2$ substituents.

In the table, the action caused by the products and the dose supplied in kg per hectare are given.

TABLE 4

| Y | $R_1$ | $R_2$ | Action |
|---|---|---|---|
| 3-$ClC_6H_4$ | H | H | Complete arrest of growth of tomatoes, ipomoea, lucerne, lupulins; tests at 10 kg./ha. |
| 4-$ClC_6H_4$ | H | H | Do. |
| $C_6H_5$ | H | $CH_3$ | Marked retardation of growth at 6 kg./ha. |
| 3-$ClC_6H_4$ | $CH_3$ | $CH_3$ | Complete arrest of growth at 6 kg./ha. |
| 4-$ClC_6H_4$ | H | $CH_3$ | Considerable slowing of growth at 6 kg./ha. |
| 4-$ClC_6H_4$ | H | $C_2H_5$ | Excellent herbicidal action at 6 kg./ha. on cruciferae, papilionaceae, gramineae. |
| 4-$ClC_6H_4$ | H | $C_3H_7$ | Considerable retardation of growth at 6 kg./ha. on the same test plants. |
| 3-$ClC_6H_4$ | $CH_3$ | $CH_3$ | Growth arrest at 10 kg. ha. (on tomatoes, impomoea, lucerne, lupulins). |
| 4-$ClC_6H_4$ | $CH_3$ | $CH_3$ | Do. |
| 4-$ClC_6H_4$ | $CH_3$ | $CH_3$ | Do. |
| Butyl | $CH_3$ | $CH_3$ | Do. |
| α-Naphthyl | $CH_3$ | $CH_3$ | Do. |

Having thus described our invention, it is obvious that certain modifications thereto will be apparent to the worker in the art and it is intended that these modifications be part of the invention as envisaged by the appended claims.

We claim:

1. A compound selected from the group consisting of compounds of the formula

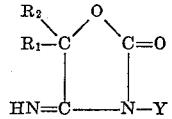

and the acid addition salts thereof, wherein: Y is selected from the group consisting of alkyl of from one to 18 carbon atoms; cyclohexyl; phenyl; phenyl substituted with chloro, methoxy, and nitro; tolyl; benzyl; furfuryl; and naphthyl;

$R_1$ and $R_2$ are each selected from the group consisting of hydrogen; alkyl of from one to eight carbon atoms;; phenyl; furfuryl; and $R_1$ and $R_2$ taken together with the carbon to which they are attached form a cyclohexyl group.

2. A compound according to claim 1 wherein Y is p-chlorophenyl, $R_1$ is hydrogen and $R_2$ is ethyl.

3. A compound according to claim 1 wherein Y is phenyl, $R_1$ is hydrogen and $R_2$ is propyl.

4. A compound according to claim 1 wherein Y is naphthyl and $R_1$ and $R_2$ are each methyl.

5. A compound according to claim 1 wherein Y is cyclohexyl and $R_1$ and $R_2$ are each methyl.

6. A compound according to claim 1 wherein Y is p-chlorophenyl, $R_1$ is hydrogen and $R_2$ is $$\begin{array}{c} CH\!-\!-\!-\!CH \\ \| \quad\quad \| \\ CH \quad C\!-\!CH_2\!- \\ \diagdown O \diagup \end{array}$$

7. A process for preparing a compound selected from the group consisting of compounds of the formula

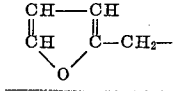

wherein: Y is selected from the group consisting of alkyl of from one to 18 carbon atoms; cyclohexyl; phenyl; phenyl substituted with chloro, methoxy, and nitro; tolyl; benzyl; furfuryl; and naphthyl;

$R_1$ and $R_2$ are each selected from the group consisting of hydrogen, alkyl of from one to eight carbon atoms;; phenyl; furfuryl; and $R_1$ and $R_2$ taken together with the carbon to which they are attached form a cyclohexyl group; which comprises heating a urethane nitrile of the formula

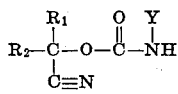

wherein Y, R$_1$ and R$_2$ are as defined above, in the absence of a solvent to a temperature below 160° C. in the presence of a weakly alkaline catalyst.

8. A process for preparing a compound selected from the group consisting of compounds of the formula

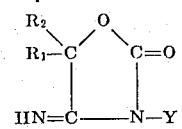

wherein: Y is selected from the group consisting of alkyl of from one to 18 carbon atoms; cyclohexyl; phenyl; phenyl substituted with chloro, methoxy, and nitro; tolyl; benzyl; furfuryl; and naphthyl;

R$_1$ and R$_2$ are each selected from the group consisting of hydrogen; alkyl of from one to eight carbon atoms;; phenyl; furfuryl; and R$_1$ and R$_2$ taken together with the carbon to which they are attached form a cyclohexyl group; which comprises adding to a solution of a urethane nitrile of the formula

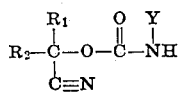

wherein Y, R$_1$, and R$_2$ are as defined above, in a solvent, an alkaline catalyst, eliminating the catalyst, and removing the solvent.

9. The process according to claim 8 in which the alkaline catalyst is an alkaline ion exchange resin.

10. A process according to claim 7 in which the alkaline catalyst is selected from the group consisting of the hydroxides of alkali metals and alkaline earth metals, salts of weak acids and strong bases, alkali metal and alkaline earth metal alcoholates, primary, secondary and tertiary amines and quaternary ammonium hydroxides.

11. A process according to claim 7 in which the catalyst used is selected from the group consisting of sodium bicarbonate, caustic soda, potassium carbonate, sodium methoxide, n-butylamine, di-n-butylamine, pyridine, dimethyl aniline, triethylenediamine and triethylamine.

12. A process according to claim 8 in which the alkaline catalyst is selected from the group consisting of the hydroxides of alkali metals and alkaline earth metals, salts of weak acids and strong bases, alkali metal and alkaline earth metal alcoholates, primary, secondary and tertiary amines and quaternary ammonium hydroxides.

13. A process according to claim 17 in which the catalyst used is selected from the group consisting of sodium bicarbonate, caustic soda, potassium carbonate, sodium methoxide, n-butylamine, di-n-butylamine, pyridine, dimethyl aniline, triethylenediamine or triethylamine.

14. A process for preparing a compound selected from the group consisting of compounds of the formula

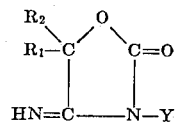

wherein: Y is selected from the group consisting of alkyl of from one to 18 carbon atoms; cyclohexyl; phenyl; phenyl substituted with chloro, methoxy, and nitro; tolyl; benzyl; furfuryl; and naphthyl;

R$_1$ and R$_2$ are each selected from the group consisting of hydrogen, alkyl of from one to eight carbon atoms; phenyl; furfuryl; and R$_1$ and R$_2$ taken together with the carbon to which they are attached form a cyclohexyl group; which comprises reacting an isocyanate of the formula YNCO with a cyanhydrin of the formula

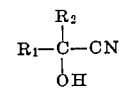

wherein Y, R$_1$ and R$_2$ are as defined above, in the presence of a weakly alkaline catalyst.

* * * * *